UNITED STATES PATENT OFFICE.

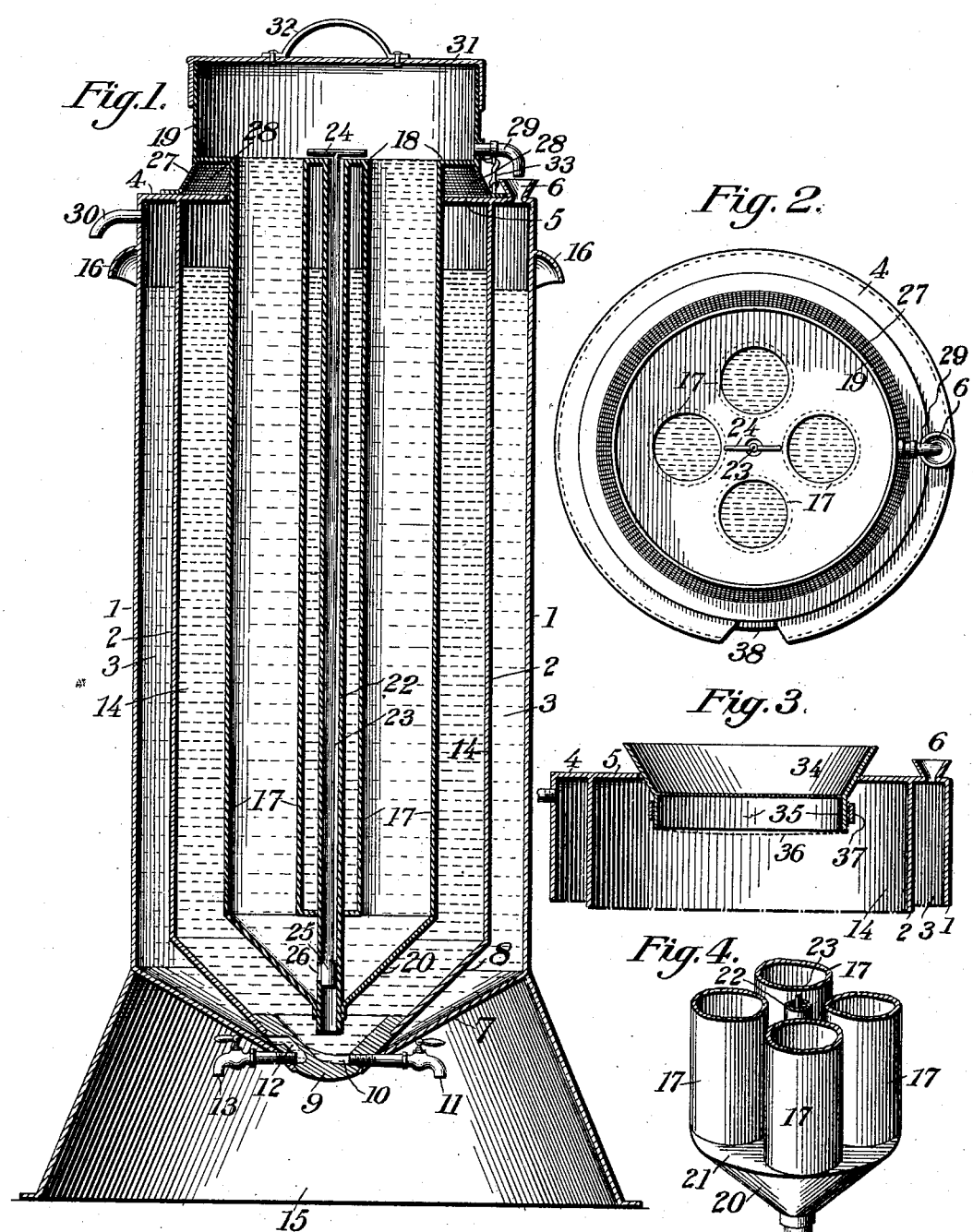

CHARLES L. MORRIS, OF FAIRBURY, NEBRASKA.

CREAM-SEPARATOR.

SPECIFICATION forming part of Letters Patent No. 697,645, dated April 15, 1902.

Application filed October 2, 1901. Serial No. 77,319. (No model.)

*To all whom it may concern:*

Be it known that I, CHARLES L. MORRIS, a citizen of the United States, residing at Fairbury, in the county of Jefferson and State of Nebraska, have invented a certain new and useful Cream-Separator, of which the following is a specification, reference being had therein to the accompanying drawings.

This invention relates to cream-separators, the object in view being to provide a simple, effective, and economical apparatus for cooling milk, and thereby effecting a separation of the cream from the milk by causing the cream to rise to the top of the vessel in which the milk is placed.

The cooler or separator is especially adapted for domestic purposes, but may of course be manufactured in larger sizes for use in hotels, restaurants, and other public places.

The construction contemplated in the invention provides for quickly and effectually cooling the milk and keeping up a circulation between a cluster of inner tubes, which are surrounded by the milk, and an outer water-chamber, which surrounds the space in which the milk is contained.

The parts of the cooler or separator are combined in such manner that they may be readily disassociated for giving access to the interior of the apparatus for cleaning purposes. Provision is made for proper ventilation during the cooling process, and the device is provided in its upper portion with a receptacle for a suitable strainer, which receptacle is closed by a cover. The device also comprises means whereby the desired quantity of water may be discharged from the inner water-tubes into the milk-space.

With the above and other objects in view the invention consists in the novel construction, combination, and arrangement hereinafter fully described, illustrated, and claimed.

In the accompanying drawings, Figure 1 is a central vertical section through a separator or cooler constructed in accordance with the present invention, showing the compartments filled as they appear in operation. Fig. 2 is a top plan view of the same with the cover removed. Fig. 3 is a detail vertical section of the upper portion of the apparatus with the water-tubes removed and the strainer inserted. Fig. 4 is a detail perspective view of the lower portion of the water-tubes, including the conical bottom with which said tubes communicate.

Like numerals of reference designate corresponding parts in all the figures.

Referring to the drawings, 1 designates the outer shell or casing, which for simplicity and economy is illustrated as of cylindrical form. Within the outer shell or casing 1 is an inner shell 2, concentric with the outer shell and arranged at a distance therefrom to give the necessary cold-water space 3. The walls or shells 1 and 2 are connected at their upper ends to a top wall 4, which extends inward beyond the shell 2 to provide an annular flange 5, which forms a seat for the strainer, hereinafter referred to, and also a brace for the inner water-tubes, as shown in Fig. 1. At a suitable point the top wall 4 is provided with a flanged opening 6 to receive the overflow-water from the inner tubes, as will hereinafter appear.

The lower portions of the outer and inner shells 1 and 2 are extended inwardly in conical form, as shown at 7 and 8, respectively, where they are permanently secured to a bottom casting 9. This casting is provided at a suitable point with an opening 10, to which is fitted a milk-faucet 11. At another point the casting 9 is provided with an opening 12, into which is fitted a drain-cock 13, said opening 12 communicating with the outer water-space 3, while the opening 10 communicates with the milk-space at the lowermost point thereof, as shown in Fig. 1. The inner shell 2 forms the outer wall of the milk-compartment, (designated at 14.)

The receptacle or vessel thus far described is mounted upon a supporting-base 15, which preferably consists of a downwardly-flaring flange, and said flange may be formed integrally with the outer shell 1 or be formed separately therefrom and suitably united thereto. The outer shell 1 is further provided at opposite points with suitable lifting and carrying handles 16.

In connection with the double-walled vessel hereinabove described I employ a cluster of water-tubes 17, which in operation are are mounted centrally within the milk-compartment, as shown in Fig. 1. All of the tubes 17 are connected at their upper ends by a horizontal top wall 18 in the form of a disk or plate, provided at its outer edge with an upstanding flange 19, forming an upper receptacle adapted to receive the strainer when not in use. The lower ends of the tubes 17 all communicate with an inverted conical receptacle 20, the top of which is covered by a plate 21, having openings to receive the tubes 17, thus preventing the water from obtaining access to the milk-compartment.

Arranged between the water-tubes 17 is a central valve-tube 22, the lower end of which projects through the vertex of the conical receptacle 20, as shown in Figs. 1 and 4, so as to communicate with the milk-space. Within the tube 22 is mounted a stem or plunger 23, provided at its upper end with a suitable handle 24, whereby it may be raised and lowered, said handle being located within the receptacle 19. At its lower end the plunger or stem 23 carries a valve 25, which normally closes a port or opening 26 in the tube 22, which opening is provided for the purpose of allowing the desired amount of water in the tubes 17 to be discharged into the milk-space for facilitating the separation of the cream from the milk.

The top wall 18 is located above the wall 4 and is supported thereupon by means of a reticulated or ventilated rim 27. The ventilator 28 is preferably continuous, so as to entirely surround the water-tubes, said ventilator being for the purpose of carrying off the heat and odors from the milk during the cooling process.

At one side the upper receptacle, formed by the flange 19, is provided with an overflow-nozzle 29, which overlies the opening 6 and allows the surplus of water in the inner tubes to flow into the outer water-space 3. Near the top of the outer water-chamber there is placed a discharge-nozzle 30, by means of which the water in the outer chamber is carried off. This enables a constant supply of cold water to circulate through the apparatus.

The upper receptacle is provided with a suitable flanged cover 31, having a lifting-handle 32, and the inner tubes, as well as the upper receptacle, are held in place by means of a hook 33, preferably connected to the main body of the receptacle and engaging an eye or keeper on the nozzle 29 or other convenient part of the upper receptacle. By this arrangement the inner water-tubes before they are filled are held submerged in the milk.

34 designates a strainer having a flared upper portion and a cylindrical bottom flange 35, over which a flexible strainer 36, such as a piece of cloth, is adapted to be stretched and held by means of a clamping-band 37, which is sprung over and around the flange 35 after the strainer-cloth has been placed thereon. The strainer when in position rests against and is upheld by the inner edge of the flange 5, as shown in Fig. 3.

38 denotes a gage arranged within an offset portion of the outer shell 1, said gage being graduated with suitable marks, so as to indicate the level of the milk and cream and the point of separation between the milk and cream, thereby assisting in separately drawing off the said milk and cream.

In operation the strainer 34 is placed in position, as shown in Fig. 3, after the water-tubes have been removed. The milk is introduced through the strainer until the receptacle is filled to the desired extent. The strainer is then removed and the water-tubes inserted, as shown in Fig. 1, where they are held submerged in the milk by means of the hook 33. Cold water is then poured into the upper receptacle, where it finds its way into the inner tubes 17. After these tubes are filled the water overflows through the nozzle 29 into the outer water-chamber 3, and when it rises to the top of said outer water-chamber overflows through the discharge-nozzle 30. The strainer 34 when not in use may be placed in the upper receptacle 19 and inclosed by the flanged cover 31. The employment of the cluster of inner water-tubes materially increases the superficial area of the inner cooling-surface, thus accelerating the action of the separator, and this effect is enhanced by reason of the fact that all of the inner tubes are entirely surrounded by the milk. The cream rapidly rises to the surface of the milk, and at any suitable moment any desired amount of cold water may be discharged from the inner tubes into the milk by manipulating the valve 25. After the separation has taken place the milk may first be drawn off through the faucet 11, after which a cream-receptacle may be placed beneath said faucet to receive the cream. The milk-receptacle may then be flushed out by opening the valve 25, and the vessel may be subsequently drained by opening the cock 13. Thus the cleaning of the apparatus may be effected without the necessity of removing the inner water-tubes.

It will be understood that the apparatus may be manufactured in various sizes to suit requirements and that other changes may be made in the form, proportion, and minor details of construction without departing from the principles of this invention.

Having thus described the invention, I claim as new—

1. In a cream-separator, a double-walled receptacle comprising an outer shell and an inner shell connected by top and bottom walls and forming an outer annular water-space, in combination with a cluster of inner water-tubes removably mounted in the receptacle, a disk or plate to which the upper ends of the water-tubes are connected for their support, said disk or plate having a ventilated flange which rests on the top of the receptacle, and means providing for a circulation of water between the inner tubes and outer water-space, substantially as described.

2. In a cream-separator, a double-walled receptacle embodying an outer annular water-space, in combination with a cluster of water-tubes centrally and removably mounted in the receptacle, an upper receptacle to which said tubes are connected at their upper ends, and a conical bottom or receptacle with which the lower ends of said tubes communicate, said conical bottom or receptacle having a valved communication with the milk-space, substantially as described.

3. In a cream-separator, a double-walled receptacle embodying an outer annular water-space, in combination with a centrally-arranged cluster of inner water-tubes, a conical bottom connecting the lower ends of said tubes, a central valve-tube arranged between the water-tubes and extending through the conical bottom, a valve controlling an opening leading from the interior of said tube to the conical bottom, and means at the top of the apparatus whereby the valve may be manipulated.

4. In a cream-separator, a vessel or receptacle comprising concentric outer and inner walls forming an outer annular water-space, a bottom casting to which said walls are connected at the bottom, and draw-off cocks connected with said casting and communicating with the milk-space and outer water-space, in combination with a cluster of inner water-tubes removably mounted in the milk-space, an upper receptacle with which said tubes communicate, and an overflow-nozzle leading from said upper receptacle to the outer water-space.

5. In a cream-separator, a double-walled outer receptacle embodying an outer water-space, and a top therefor comprising an inwardly-extending annular flange which overhangs the milk-space, in combination with a cluster of inner water-tubes removably mounted in the milk-space and having their upper and lower ends placed in communication with each other and out of communication with the milk-space, means for filling and emptying said water-tubes, and means whereby the inner tubes are placed in communication with the outer water-space.

6. In a cream-separator, a double-walled receptacle embodying an outer water-space, in combination with a cluster of inner water-tubes removably mounted therein, an upper receptacle to which said tubes are connected and with which they communicate, an overflow-nozzle connected with said upper receptacle and adapted to discharge into the outer water-space, and fastening means for holding the water-tubes in place, substantially as described.

In testimony whereof I affix my signature in presence of two witnesses.

CHARLES L. MORRIS.

Witnesses:
J. MONROE DAVIS,
HONER R. GRAY.